Figure 1:
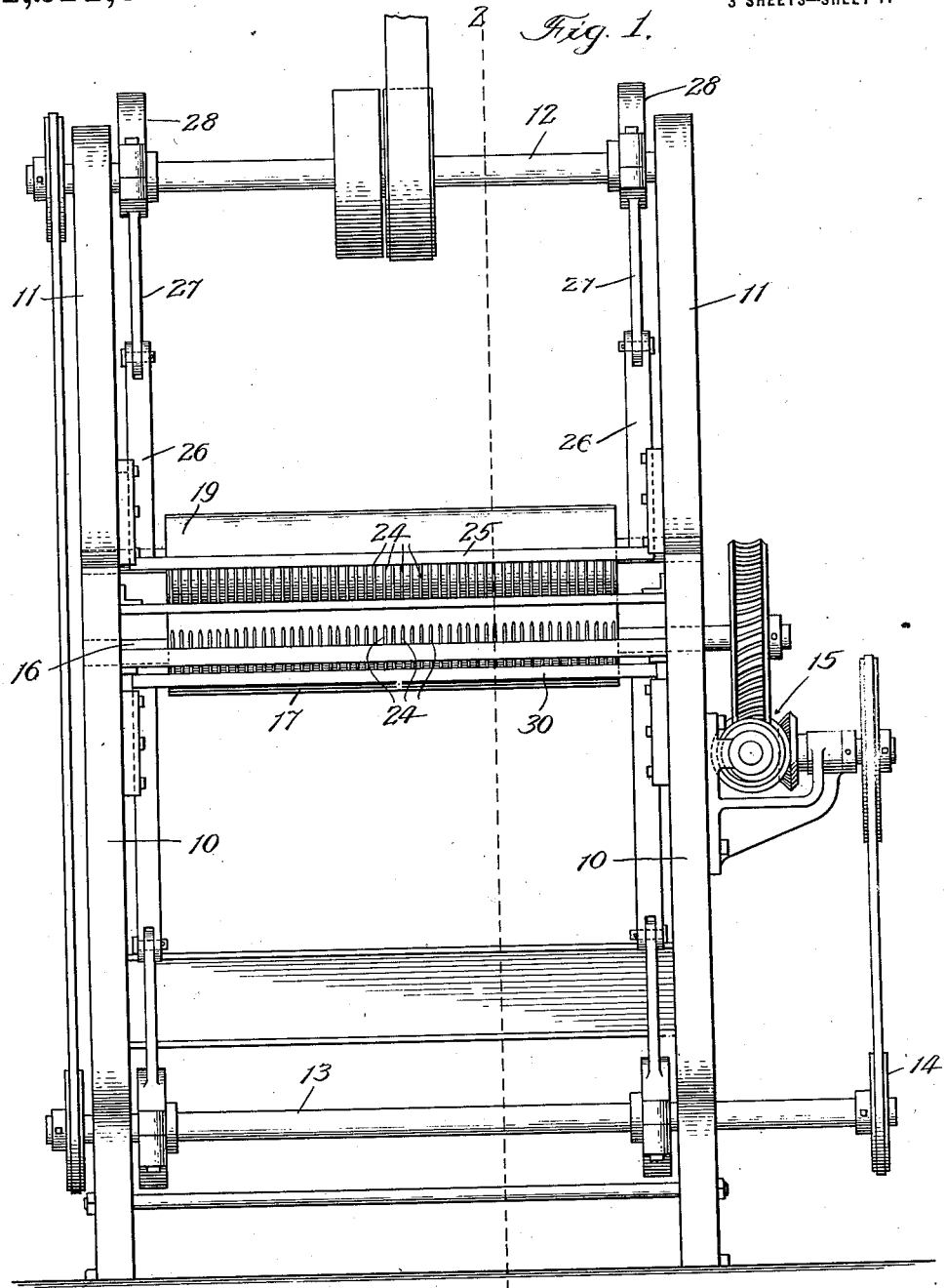

C. A. CARLSON & H. E. HILL.
MACHINE FOR INTERLACING CURLED HAIR.
APPLICATION FILED SEPT. 5, 1916.

1,211,821. Patented Jan. 9, 1917.
3 SHEETS—SHEET 1.

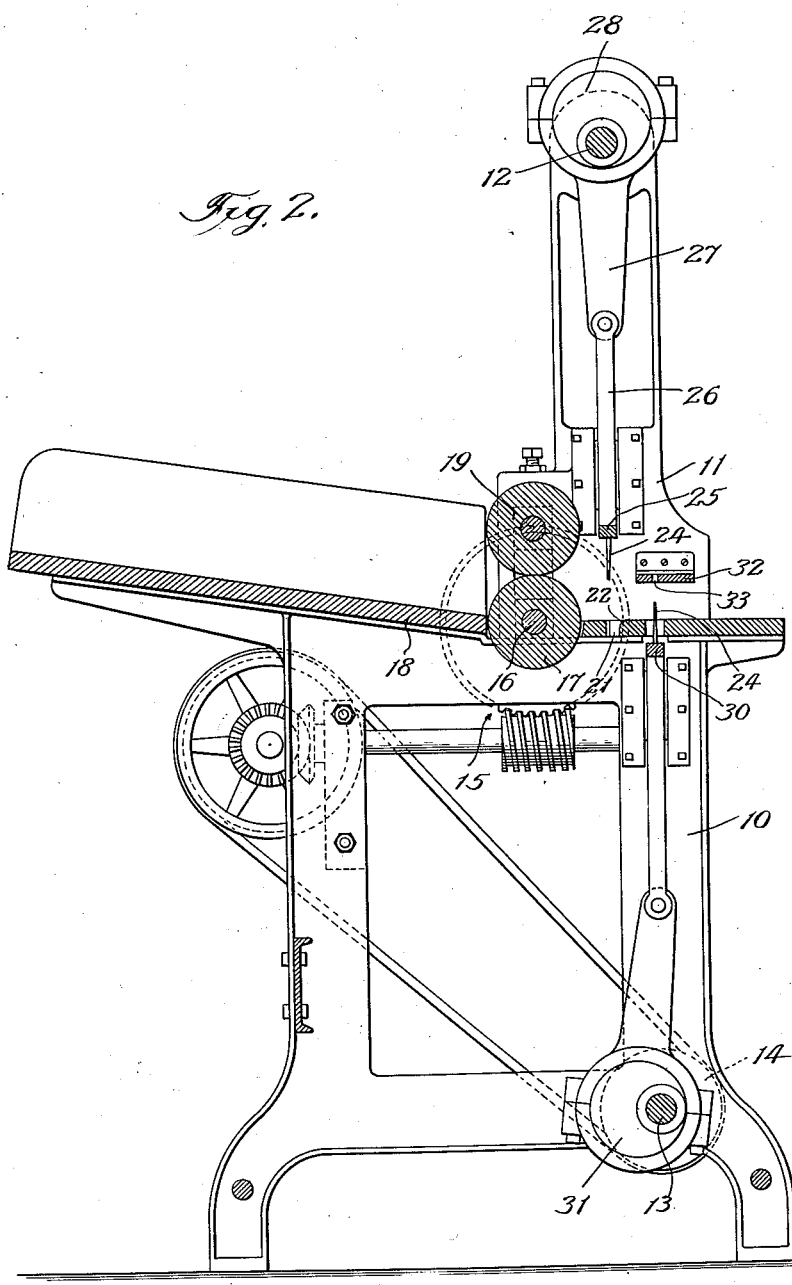

C. A. CARLSON & H. E. HILL.
MACHINE FOR INTERLACING CURLED HAIR.
APPLICATION FILED SEPT. 5, 1916.
1,211,821.
Patented Jan. 9, 1917.
3 SHEETS—SHEET 3.
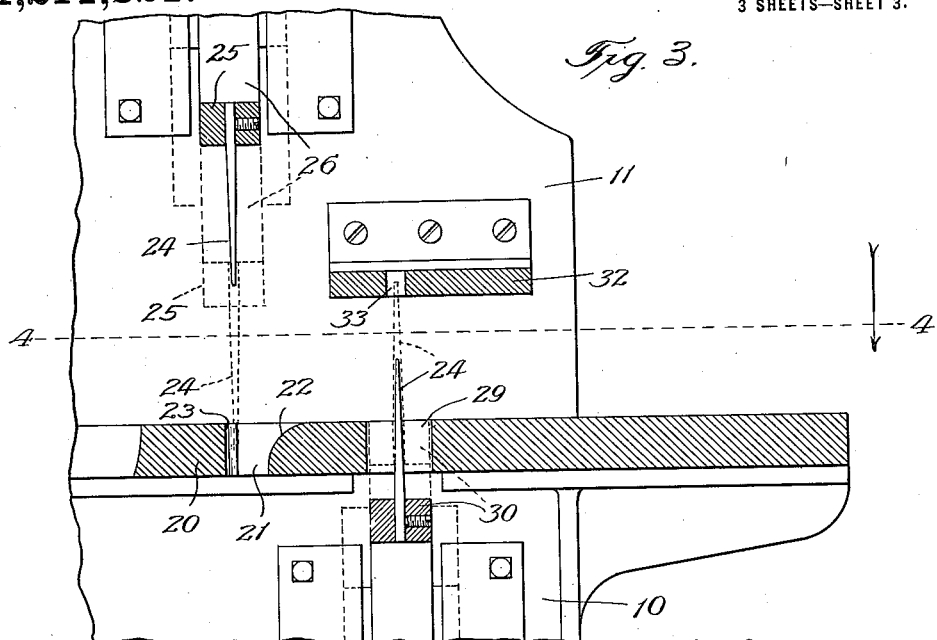
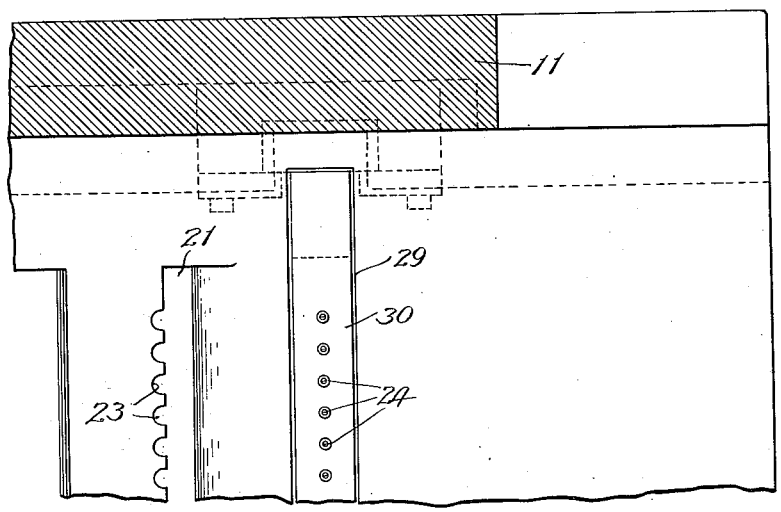
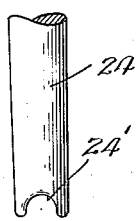
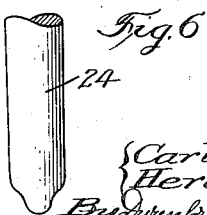

UNITED STATES PATENT OFFICE.

CARL A. CARLSON AND HERBERT E. HILL, OF CHICAGO, ILLINOIS, ASSIGNORS TO MORRIS & COMPANY, OF CHICAGO, ILLINOIS, A CORPORATION OF MAINE.

MACHINE FOR INTERLACING CURLED HAIR.

1,211,821. Specification of Letters Patent. Patented Jan. 9, 1917.

Application filed September 5, 1916. Serial No. 118,376.

*To all whom it may concern:*

Be it known that we, CARL A. CARLSON and HERBERT E. HILL, citizens of the United States, residing at Chicago, in the county of Cook and State of Illinois, have invented a new and useful Improvement in Machines for Interlacing Curled Hair, of which the following is a specification.

Our invention relates to certain new and useful improvements in machines for interlacing curled hair to produce sheets or mats.

The invention will be more fully understood from the following detailed description of one specific embodiment thereof, taken in connection with the accompanying drawings, in which:—

Figure 1 is a front elevation of one form of machine constructed in accordance with the invention; Fig. 2 is a section on the line 2—2, of Fig. 1; Fig. 3 is an enlarged sectional view showing the relations of the needle-bars and throat-plates; Fig. 4 is a section on the line 4—4, of Fig. 3, and Figs. 5 and 6 are enlarged views of a needle point.

Referring more particularly to the drawings, the numeral 10 designates the frame of the machine, which, as shown is of generally rectangular form and carries columns 11, which serve to support a horizontal drive-shaft 12 which may be equipped with tight and loose pulleys as shown in Fig. 1, or may be driven by any other preferred means. The drive-shaft 12 is extended beyond one of the columns 11 and bears a pulley which is belted to a similar pulley on the projecting end of a second horizontal shaft 13, mounted near the base of the frame 10. The shaft 13 carries a second pulley 14 which, through the belt connection and bevel-gear and worm-gear-trains, designated as a whole by 15, drives a roll-shaft 16 journaled horizontally near the top of the frame. The roll-shaft 16 carries a lower feed-roll 17 which operates in a proper recess in a table bed 18 which slopes from the rear of the machine downward to the feed-roll. Above the roll 17 there is mounted a second feed-roll 19 which is preferably adjustable vertically with reference to the roll 17. In the drawings, we have shown the two rolls in contact, but it will be understood that ordinarily they will be spaced apart some suitable distance as determined by the thickness of the mat or sheet which is to be produced by the machine. It will also be noted that we have shown no means for driving the upper roll 19, as we find that it will ordinarily be unnecessary to provide any positive drive for this roll. We recognize, however, that under some conditions it is desirable to positively drive both of the feed-rolls.

In front of the feed-roll 17 the table top or upper surface of the frame extends horizontally, and is cut to form a throat-plate designated 20 and particularly illustrated in Figs. 3 and 4, in which it will be seen that the throat aperture is in the form of a slot 21 having its upper front edge finished on an arc as shown at 22, and having a plurality of notches 23 of semi-circular cross-section cut in its rear face. For coöperating with the throat 21 we provide a series of needles 24 carried on an upper reciprocating needle-bar 25 which extends transversely of the machine. The needles are so spaced in the bar 25 as to aline with the axes of the semi-circular notches 23 so that each needle in the downward movement of the bar will enter a notch in the throat 21, as indicated by the dotted lines in Fig. 3. The two ends of the needle-bar 25 are carried by cross-head members in the form of vertical bars 26 which travel in suitable vertical slide-ways or guides in the columns 11, as shown in Fig. 2. Each of the cross-head bars 26 is connected with a pitman 27 operable from the eccentric 28 on the upper shaft 12.

In front of the throat 21 the table-surface has a second slot 29 therein designed to receive a lower needle-bar 30 carrying a series of needles preferably equal in number to, and arranged in longitudinal alinement with, the needles of the upper bar 25. The lower needle bar 30 is supported and driven through pitman and cross-head connections from eccentrics 31 on the lower shaft 13, the operating connections of the lower needle-bar being preferably the same as those of the upper bar. The throat-plate of the needles carried by the bar 30 is mounted between the columns 11 as shown at 32, being in the form of a relatively broad bar having a planed lower surface parallel with the surface of the lower throat-plate and having orifices 33 suitably spaced to receive the lower needles. The parts are so proportioned that the upper needles will penetrate a considerable distance within, or even pass completely through, the lower throat 21, while the lower needles will barely enter the perforations 33 in the upper throat-plate.

In Figs. 5 and 6, we have illustrated the form of needle point which we find to give the most satisfactory results in the machine above described. As is here illustrated each needle 24 has a relatively blunt point in which there is formed a notch or groove $24^1$, the notch being of approximately semi-circular cross-section and all edges upon the needle point carefully rounded to avoid cutting of the hairs. We prefer to arrange the needles in the respective needle-bars with the notches $24^1$ extending longitudinally, that is, from front to back of the machine, or transversely of the needle-bars.

In the operation of our machine the upper shaft 12 will be driven as through the pulley connection shown in Fig. 1, and from this shaft motion will be communicated to the feed-roll 17 and to the lower shaft 13. A quantity of loose curled hair will be placed upon the table 18, and by the action of the feed-rolls 17, 19, this hair will be fed forwardly in a sheet of predetermined thickness according to the adjustment of the rolls into the path of the needles carried by the upper bar 25, and at the downward stroke of this needle-bar, the needles thereof will be driven through the body of hair emerging from between the rolls. In their passage through the hair the notches $24^1$ of the needles will engage a certain number of hairs to draw them through the body into the throat 21. Simultaneously, the body of hair as a whole will be compressed between the lower face of the needle-bar 25 and the upper face of the throat-plate 20. This compression should be carefully limited in amount, however, in order to avoid a permanent set or loss of springiness of the hair. In the outward movement of the needle-bar 25, those hairs which were pushed through the throat 21 will be released and will immediately curl upward against the lower face of the mat, thereby serving as tie members binding the two faces of the mat together. By continued movement of the sheet of hair now partially felted or laced together, it will come into the path of the lower needles, and by the latter the hairs on the lower face of the mat will be pushed through into the body of the mat, thereby more securely binding the mass together. The lower needle-bar 29 also acts as a means for compressing the mat between its upper surface and the lower surface of the throat-plate 32. The stroke of the lower needles 24 is purposely limited to substantially the plane of the upper throat-plate, since we have found that better results are secured by this construction.

Although it is quite difficult if not impossible to analyze the precise steps of the interlacing process, experiments which we have conducted, making use of hairs of two distinct colors in the upper and lower surfaces of the mat, indicate that by the successive operation of the two sets of needles of the form shown, in combination with the continuous feed and the arrangement of the two throats, the longer hairs on the upper surface of the mat have their ends pulled downwardly completely through the mat by the action of the upper set of needles, and by the wide lower throat 21 are permitted to flatten out against the lower face of the mat in such position that they are caught by the lower set of needles in their onward movement, and by these needles again driven upwardly into the body of the mat. In general, therefore, the action of the two sets of needles is believed to result in driving a certain proportion of the longer hairs, which emerge from the body of the mat and cross the upper surface thereof, through the mat, over the lower surface thereof for some distance, and back up into the body.

We do not find that it makes any perceptible difference whether the two needle-bars 25, 30, or more accurately, the shafts 12, 13, which actuate the same, are driven synchronously or not. In practice the belt drive which we have illustrated seems to be as satisfactory as any form of positive drive which would secure accurate timing of the relative movements of the two needle-bars. Since the reciprocations of the needles are so frequent relative to the feed of the mat, it seems quite probable that the relative timing of the movements of the two needle-bars is wholly immaterial.

While we have shown and described in considerable detail one specific embodiment of our invention, together with our theory of the exact manner in which the same operates, it is to be understood that these details are illustrative only and for the purpose of making more clear the nature and objects of the invention and that we do not regard the invention as limited to such details, except in so far as we have included such limitations within the terms of the following claims, in which it is our intention to claim all novelty inherent in our invention as broadly as is permissible in view of the prior art.

What we claim as new and desire to secure by Letters Patent, is:—

1. A curled-hair interlacing-machine comprising a mat-supporting table, means for feeding a mat across the table, and two sets of reciprocating needles adapted to act upon the opposite surfaces of the said mat, the two sets of needles being offset from one another in the direction of motion of the mat.

2. In a curled-hair interlacing-machine, a mat-supporting table, means for feeding a mat across the table, an upper needle-bar arranged transversely of the direction of motion of the mat, a plurality of needles carried thereby, a lower needle-bar parallel with said upper bar and offset therefrom in the direction of motion of the mat, a plurality of needles carried by said lower bar, and means for reciprocating the two bars to cause the needles carried thereby to alternately enter and draw out of said mat.

3. A curled-hair interlacing-machine comprising a mat supporting table, means for feeding a mat across the table, a set of needles arranged opposite one face of the said mat, and having notched points, means for driving said needles through the said mat, a throat-plate for receiving the projected ends of the said needles as they pass outward through the mat, the said throat-plate having a throat aperture therein extending in the direction of motion of the mat, a second set of needles arranged opposite said first set and longitudinally spaced therefrom in the direction of motion of the mat, and means for driving said second set of needles into the mat, said second set of needles likewise having notched points.

4. A curled-hair interlacing-machine comprising a mat-supporting table, means for feeding a mat across the said table, a needle-bar arranged above the surface of said table for movement toward and away from the mat carried thereby, a set of needles carried by said needle-bar and in a line transverse to the direction of motion of the mat, each of said needles having a notched point, a throat aperture in said table for receiving the projected ends of the needles as they pass outwardly through the mat, said throat aperture being extended in the direction of motion of the mat, and the needles being of such length as to permit the needle-bar to compress the mat between its surface and the said throat on the inward stroke of the needles.

5. In a curled-hair interlacing-machine, means for forming and feeding a mat, a pair of needle-bars arranged transversely to the direction of motion of the mat and on opposite faces thereof, said needle-bars being offset in the direction of motion of the mat, needles carried by said bars and having notched points, and throat members arranged opposite each set of needles.

6. In a curled-hair interlacing-machine, means for forming and feeding a mat, a pair of needle-bars arranged transversely to the direction of motion of the mat and on opposite faces thereof, said needle-bars being offset in the direction of motion of the mat, needles carried by said bars and having notched points, and throat members arranged opposite each set of needles, the needles being of such length that each needle-bar serves to compress the mat between its inner surface and the opposed surface of the throat member.

7. A needle for use in curled-hair interlacing-machines having a relatively blunt point with a transverse notch therein.

8. A needle for use in curled-hair interlacing-machines having a rounded point provided with a transverse notch of curved cross-section, the said point being free of all sharp edges.

CARL A. CARLSON.
HERBERT E. HILL.